G. ROSSI.
HORSESHOE.
APPLICATION FILED MAR. 27, 1918.
1,283,567.
Patented Nov. 5, 1918.
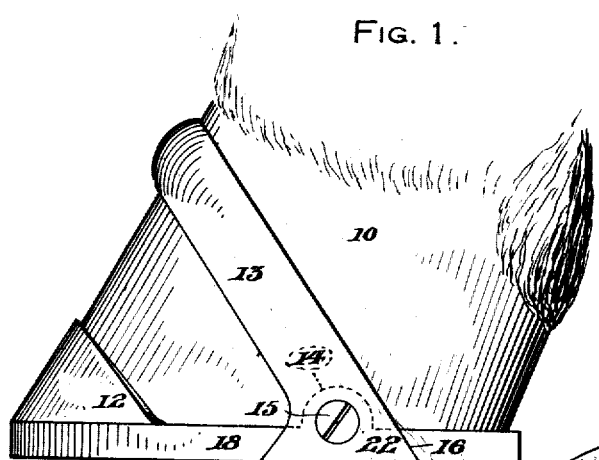
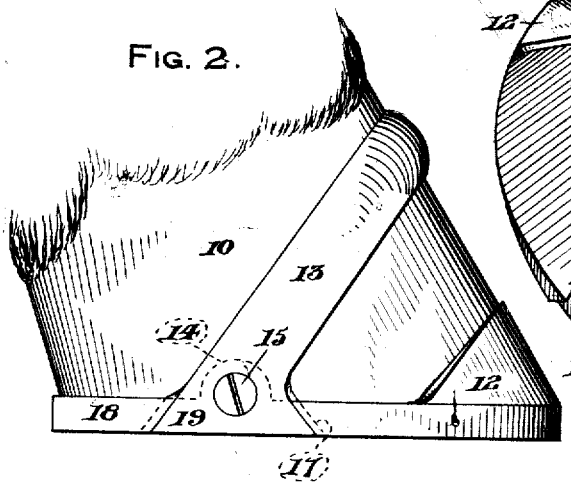
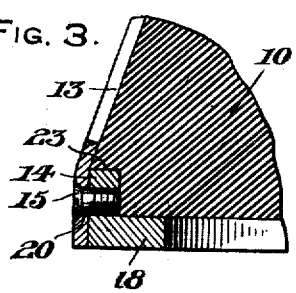
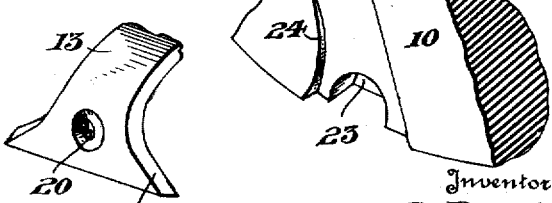
Inventor
G. Rossi
By A. M. Wilson
Attorney

UNITED STATES PATENT OFFICE.

GIOSUE ROSSI, OF MORRISDALE, PENNSYLVANIA.

HORSESHOE.

1,283,567.  Specification of Letters Patent.  Patented Nov. 5, 1918.

Application filed March 27, 1918. Serial No. 224,978.

*To all whom it may concern:*

Be it known that I, GIOSUE ROSSI, a subject of the King of Italy, residing at Morrisdale, in the county of Clearfield and State of Pennsylvania, have invented certain new and useful Improvements in Horseshoes, of which the following is a specification.

The primary object of the invention is the provision of a horseshoe that is easy and inexpensive to manufacture and which may be quickly placed upon a horse's hoof giving great security to the attachment and mounting thereof.

A further object of the device is the provision of a horseshoe readily positionable upon a hoof and provided with a detachable bracing member adapted for preventing the hoof from creeping forwardly upon the shoe when the same is in use.
A still further object of the device is the provision of a horseshoe having a position retaining means carried thereby and adapted for arrangement in its operative position upon the shoe and hoof by holdfast devices without extending into the hoof, retaining the members in position without injuring the hoof and readily attached and detached.

In the drawing forming a part of this application and in which like designating characters refer to corresponding parts throughout the several views:—

Figure 1 is a side elevation of the device operatively arranged upon a horse's hoof;

Fig. 2 is a side elevation of the opposite side thereof;

Fig. 3 is a detail sectional view through one of the connecting means;

Fig. 4 is a perspective view of the shoe with the brace removed;
Fig. 5 is a perspective view of a recessed portion of the hoof arranged for retaining the shoe upon the hoof; and Fig. 6 is a similar view of one end of the brace.
My invention being adapted for use in shoeing animals such as horses, the same is herein illustrated in connection with the hoof 10 of a horse, the device broadly comprising the shoe proper, designated 11 upon which the hoof 10 is adapted to seat, positioned inwardly of an upwardly extending toe-plate or cap 12. The shoe is placed against the hoof 10 in substantially the same manner as the ordinary horseshoe now in use but is retained thereon without the use of the ordinary horseshoe nails.

A substantially semi-circular bail or brace 13 is adapted for spanning the forward portion of the hoof 10 in contact therewith above the cap 12. Oppositely disposed substantially semi-circular ears 14 are positioned upon the upper face of the shoe 11 inwardly of tapering slots or notches 16 and 17 in the adjacent outer edge 18 of the shoe.

One of these notches such as 17 is arranged for forming a dovetail joint with a correspondingly formed enlarged end or head 19 provided upon one end of the brace 13. The head 19 is readily engaged in the notch 17 for maintaining the brace upon the shoe by upwardly moving the said head within the notch 17 to the position best illustrated in Fig. 2 of the drawing, and when so arranged a screw 15 may be extended through a perforation 20 in the head 19 for threading engagement with the perforation 21 in the adjacent ear 14.

The opposite notch 16 is provided with straight sides and is adapted to receive the head 22 at the opposite end of the brace 13 by laterally moving the head 22 into the notch 16. A screw 15 is then positioned through the head 22 and into the perforation 21 of the adjacent ear 14 for retaining the brace 13 in position.

An upwardly extending socket 23 is cut in the bottom of the hoof 10 adjacent each side adapted for receiving the ears 14 when the shoe 11 is positioned upon the hoof with the cap 12 overlying the forward end of the hoof. Curved upwardly extending grooves 24 are provided in the sides of the hoof 10 outwardly of the sockets 23 for accommodating the portions of the brace 13 adjacent the headed ends thereof.

When it is desired to apply the shoe 11 upon the hoof 10, the hoof is seated upon the upper face of the shoe with the ears 14 located within the sockets 23 and the toe portion of the hoof positioned within the cap 12 as heretofore noted and herein illustrated, while the dovetail head 19 of the brace 13 may then be moved upwardly for seating engagement within the notch 17 of the shoe and the adjacent groove 24 of the hoof, and the screw 15 is then inserted through the said head and ear. It will be understood that the brace 13 possesses sufficient resiliency to permit the same to spring laterally outwardly of the opposite side of the shoe and into the groove 16 and the adjacent groove 24 of the hoof, whereupon the screw 15 is threaded through the head 22 into the adjacent ear 14. It will be seen that the shoe may be released in a similar manner by removing the screw 15 from the head 22 and springing the brace 13 so as to remove the head 22 from the notch 16. The other screw 15 is then removed from the head 19 and adjacent ear 14 permitting the head 19 to be detached from the dovetail notch 17, whereupon the shoe may be readily removed from the hoof.

It will be seen that the shoe 11 is retained upon the hoof 10 solely by means of the screws 15, which screws also maintain the bail or band 13 in a position to coöperate with the toe-plate 12 in preventing the hoof from slipping forwardly upon the shoe when worn by the animal. A serviceable shoe is provided which may be quickly and securely positioned upon the hoof and the same may also be removed when found desirable. The device is especially serviceable where the animal is sustaining loads primarily during travel upon steep roads or declines. The device possesses great simplicity and strength, and it will be understood that while the preferred embodiment thereof is herein illustrated, minor changes may be made therein which fall within the spirit and scope of the appended claims.

What I claim as new is:—

1. A horseshoe construction comprising a shoe having tapered notches in its opposite edges, perforated ears upon the shoe inwardly of said notches, a resilient brace having a head at one end adapted for dovetail engagement with one of said notches, a head at its opposite end adapted for lateral positioning within the other notch, and connecting screws between the said heads and ears.

2. An article of manufacture comprising a horseshoe having notches in its opposite outer edges tapered toward the hoof-receiving side of the shoe and one of the said notches being dovetail in form, perforated ears upon the shoe inwardly of said notches, a substantially semicircular brace having a flaring head at one end adapted for dovetail engagement with the said dovetail notch and further having a flaring head at its opposite end adapted for lateral positioning within the other notch, upstanding ears upon the shoe inwardly of said notches, and retaining screws connecting said heads and ears.

In testimony whereof I affix my signature.

GIOSUE ROSSI.